US009124691B2

(12) United States Patent
Hicks, III et al.

(10) Patent No.: US 9,124,691 B2
(45) Date of Patent: Sep. 1, 2015

(54) LIFE CYCLE MANAGEMENT OF USER-SELECTED APPLICATIONS ON WIRELESS COMMUNICATIONS DEVICES

(75) Inventors: John Alson Hicks, III, Roswell, GA (US); Douglas R. O'Nell, Marietta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 498 days.

(21) Appl. No.: 13/307,713

(22) Filed: Nov. 30, 2011

(65) Prior Publication Data

US 2012/0079475 A1 Mar. 29, 2012

Related U.S. Application Data

(63) Continuation of application No. 11/555,536, filed on Nov. 1, 2006, now Pat. No. 8,126,128.

(51) Int. Cl.
*G06F 9/445* (2006.01)
*H04M 3/42* (2006.01)
*H04M 1/725* (2006.01)
*G06Q 30/02* (2012.01)
*H04M 3/487* (2006.01)

(52) U.S. Cl.
CPC ............. *H04M 3/42178* (2013.01); *G06F 8/61* (2013.01); *G06Q 30/02* (2013.01); *H04M 1/72525* (2013.01); *H04M 1/72583* (2013.01); *H04M 3/4878* (2013.01)

(58) Field of Classification Search
USPC ............. 379/114.04, 114.05, 114.13, 201.05, 379/121.06, 123, 221.07; 717/174, 175, 717/168, 178, 177, 173
See application file for complete search history.

(56) References Cited

U.S. PATENT DOCUMENTS

| | | | |
|---|---|---|---|
| 7,266,595 B1 * | 9/2007 | Black et al. ................... 709/223 |
| 2003/0147369 A1 * | 8/2003 | Singh et al. ................... 370/338 |
| 2004/0015998 A1 | 1/2004 | Bokor et al. | |
| 2004/0043753 A1 | 3/2004 | Wake et al. | |
| 2004/0226034 A1 | 11/2004 | Kaczowka et al. | |
| 2005/0026568 A1 * | 2/2005 | Hawker et al. ................. 455/70 |
| 2007/0157241 A1 | 7/2007 | Walker | |
| 2009/0094350 A1 | 4/2009 | Rive et al. | |

* cited by examiner

*Primary Examiner* — Yosef K Laekemariam
(74) *Attorney, Agent, or Firm* — Parks Wood LLC

(57) ABSTRACT

Tools and techniques for performing life cycle management of user-selected applications on wireless communications devices are described herein. In part, the tools provide machine-readable media for presenting to the subscriber a list of available applications for installation on the device, and for receiving selections from the subscriber of one or more of the applications. Additionally, the tools provide methods for selling advertising space on the devices.

20 Claims, 7 Drawing Sheets

LIFE CYCLE MANAGEMENT OF USER-SELECTED APPLICATIONS ON WIRELESS COMMUNICATIONS DEVICES

BACKGROUND

As wireless communications devices become more powerful and sophisticated, an increasing number of applications are becoming available for these devices. Additionally, different makes and models of such devices continue to proliferate. As the market for such devices expands, different types of customers may consider purchasing and using these devices, and installing different applications on those devices.

Typically, the customers manually install the applications onto the devices, and thereafter maintain the applications manually, including un-installing applications. In some cases, installing and managing these applications may be a challenge, particularly for inexperienced or casual customers. For example, it may be difficult for a customer to determine whether his or her device meets the minimum configuration specified for a given application of interest. Once the application is installed, customers may not be aware of subsequent updates, bug fixes, or upgrades available for the application, unless the customers proactively search for these items.

SUMMARY

Tools and techniques for performing life cycle management of user-selected applications on wireless communications devices are described herein. In part, the tools provide machine-readable media for presenting to the subscriber a list of available applications for installation on the device, and for receiving selections from the subscriber of one or more of the applications. The tools provide a mechanism for removing applications from the device. Additionally, the tools provide methods for selling advertising space on the devices.

BRIEF DESCRIPTIONS OF THE DRAWINGS

The teachings herein are described with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
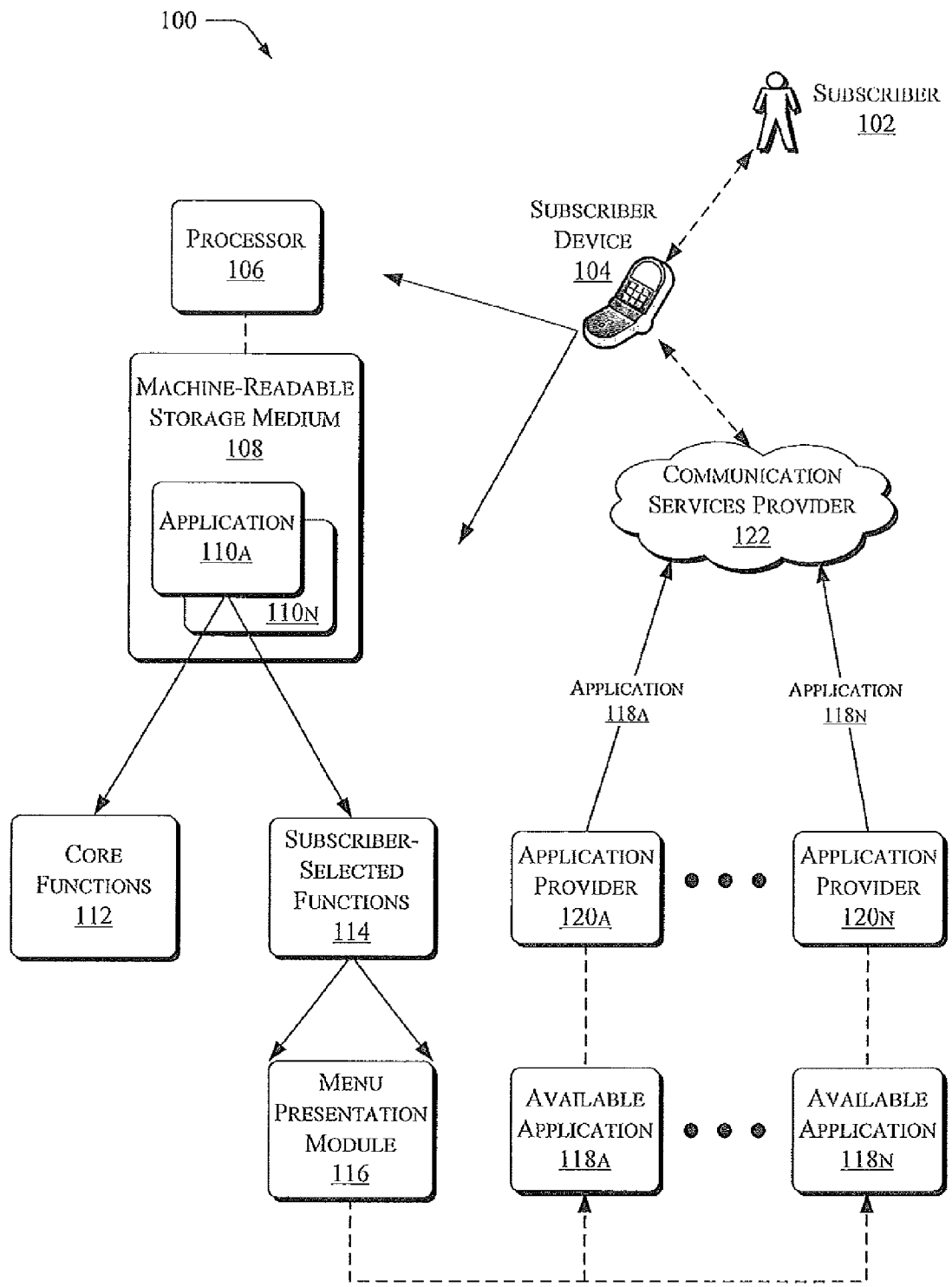
FIG. 1 is a block diagram of an overall environment for performing life cycle management of user-selected applications on wireless communications devices.

FIG. 1 illustrates an overall environment 100 for performing life cycle management of user-selected applications on wireless communications devices. A customer or user, illustrated in FIG. 1 as a "subscriber" 102 may use a communication device, illustrated in FIG. 1 as a "subscriber device" 104, and may obtain services related thereto. It should be appreciated that the term "subscriber" includes not only a user with a subscription to a communication service for a communication device but also an authorized user of the communication service for the communication device. Moreover, although one subscriber and one subscriber device are shown in FIG. 1 for simplicity of illustration, it should be appreciated that any number of subscribers and subscriber devices may be used.

The device 104 may include one or more processors 106 that communicate with one or more instances of machine-readable or computer-readable storage media 108. The media 108 may store software that may be loaded into the processor 106 and executed, thereby causing the device 104 to perform the various functions described herein. More specifically, the media 108 may store one or more applications 110. FIG. 1 shows two applications 110A and 110N for convenience only, but the media 108 may contain any number of applications.

The applications 110 may be characterized as core functions, represented generally at block 112, or as subscriber-selected functions, represented generally at block 114. Generally, the core functions 112 may be installed on the device 104 as a minimum configuration, and may include applications related to authenticating subscribers, registering the devices on communications networks, handling over the devices from one cell or network to another, providing voice communications and voice mail services, or the like.

The subscriber-selected functions 114 may provide extra features additional to the core functions 112. The subscriber 102 may select one or more of these functions for installation on the device 104, either at the time of purchasing the device 104 or some time afterwards. Examples of the subscriber-selected functions 114 may include applications related to e-mailing, voice over IP (VoIP) functions, instant messaging (IMing), chat clients, location, video on demand, multi-player gaming or the like.

The media 108 may include a menu presentation module 116 that assembles a menu containing one or more available applications 118 for selection and installation on the device 104. The menu presentation module 116 may present the menu to the subscriber using the device 104. The available applications 118 may correspond to the subscriber-selected functions 114. By selecting one or more of the available applications presented on the menu, the subscriber may configure the device 104 to perform any of the subscriber-selected functions 114. FIG. 1 shows two available applications 118A and 118N for convenience of illustration only, but the environment 100 may include any number of available applications.

One or more application providers 120 may provide the available applications 118 to a communications services provider 122. In the course of obtaining rights to use the device 104 and accessing services related thereto, the subscriber 102 may interact or contract with the services provider. In turn, the services provider 122 may have relationships with one or more of the application providers 120. The application providers 120 may be related or unrelated to the services provider 122. For example, one or more of the application providers 120 may be third-party software vendors, relative to the services provider.

The device 104 may be responsive to subscriber input, selecting one or more of the available applications, for installation. In this manner, the environment 100 enables the subscriber 102 to customize the device with applications 118 suited to his or her particular purposes.

The applications 118 may include standalone client applications that reside and execute only on the device 104, or may include client applications that interact with one or more server applications on the communication services provider 122. Additionally, the client applications 118 may interact with one or more server applications provided by third parties, with these server applications accessible through a network associated with the communication services provider 122.

Figure 2:
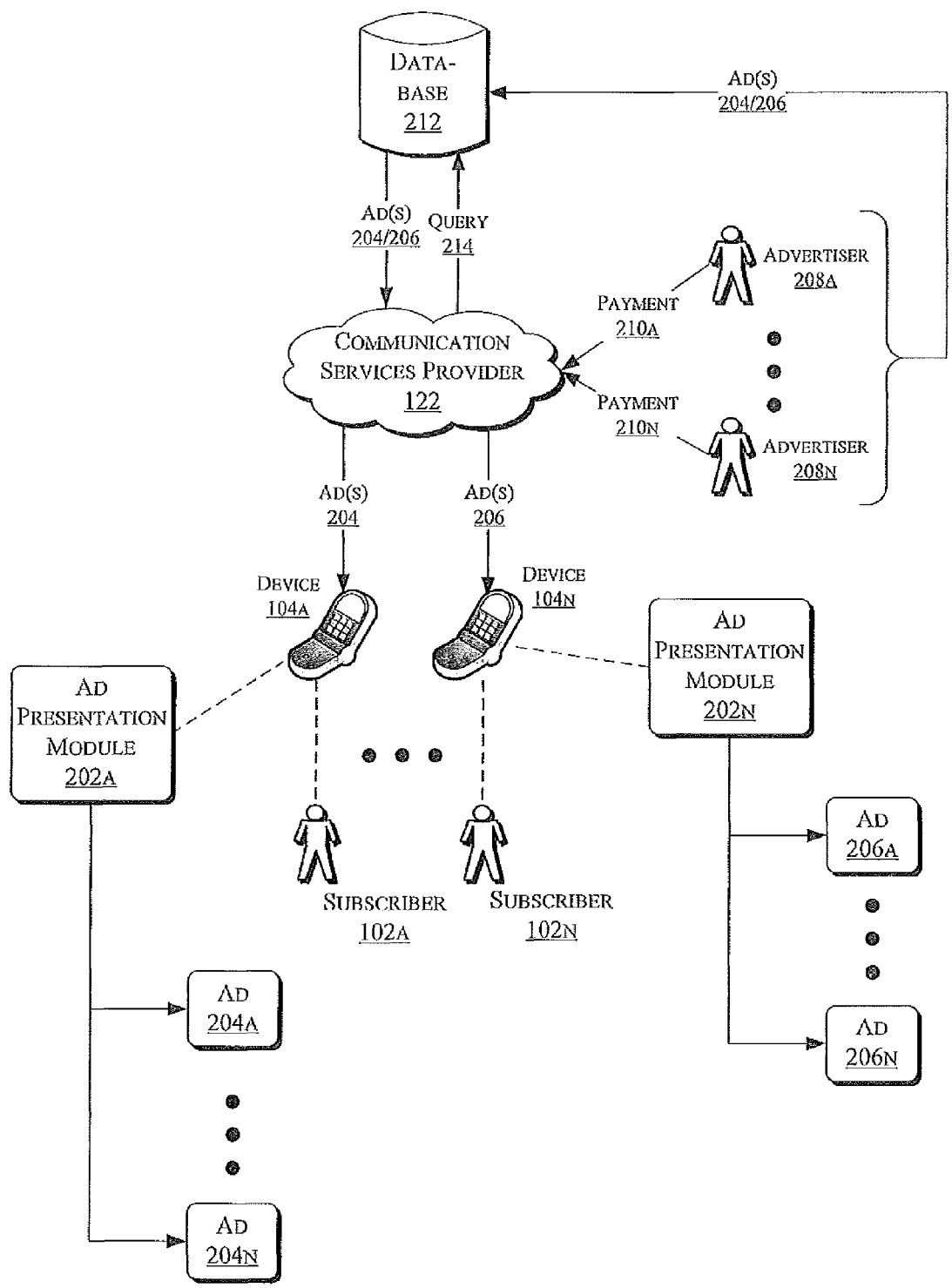
FIG. 2 is a combined block and flow diagram of methods related to selling advertising space on the wireless communications devices.

Having described the environment 100 with FIG. 1, the discussion now turns to a description of methods related to selling advertising space on the wireless communications devices, now presented with FIG. 2.

FIG. 2 illustrates components and flows related to methods for selling advertising space on the wireless communications devices. As described above in FIG. 1, the subscribers 102A and 102N may obtain corresponding devices 104A and 104N from the services provider 122. The devices 104A and 104N may include respective advertisement presentation modules 202A and 202N (collectively, advertisement presentation modules 202). These advertisement presentation modules may be similar to the menu presentation module 116 shown in FIG. 1. However, the advertisement presentation module 202A may present one or more advertisements 204A and 204N (collectively, advertisements 204) to the subscriber 102A via the device 104A, and the advertisement presentation module 202N may present one or more advertisements 206A and 206N (collectively, advertisements 206) to the subscriber 102N via the device 104N.

One or more advertisers 208 may provide the advertisements 204 and 206, through the services provider 122. FIG. 2 shows two advertisers 208A and 208N for convenience only, but any number of advertisers could be included. In exchange for placing their advertisements before the subscribers 102 via the devices 104, the advertisers 208 may provide respective payments 210A and 210N to the services provider.

In addition, the services provider 122 may intelligently select advertisements to be presented to the subscribers by querying a database 212. For example, the database 212 may store information reflecting past transactions conducted between the services provider and the subscribers 102. The database 212 may store demographic profiles of the subscribers. In other instances, the database 212 may store information pertaining to relationships with third parties. For example, the services provider and such third parties may enter into branding or marketing arrangements, so that the customers of the third parties may subscribe to the services offered by the services provider on some set of terms.

In any event, the services provider may query the database 212 with some identifier associated with a given subscriber, denoted generally as query 214. In response to the query, the database may return one or more ads that are selected specifically for the subscriber, based on, for example, preferences or past history associated with the subscriber. These ads may be provisioned onto the device, so that when the subscriber first powers-on the device, or at any time afterwards, the ads are presented on the device.

Figure 3:
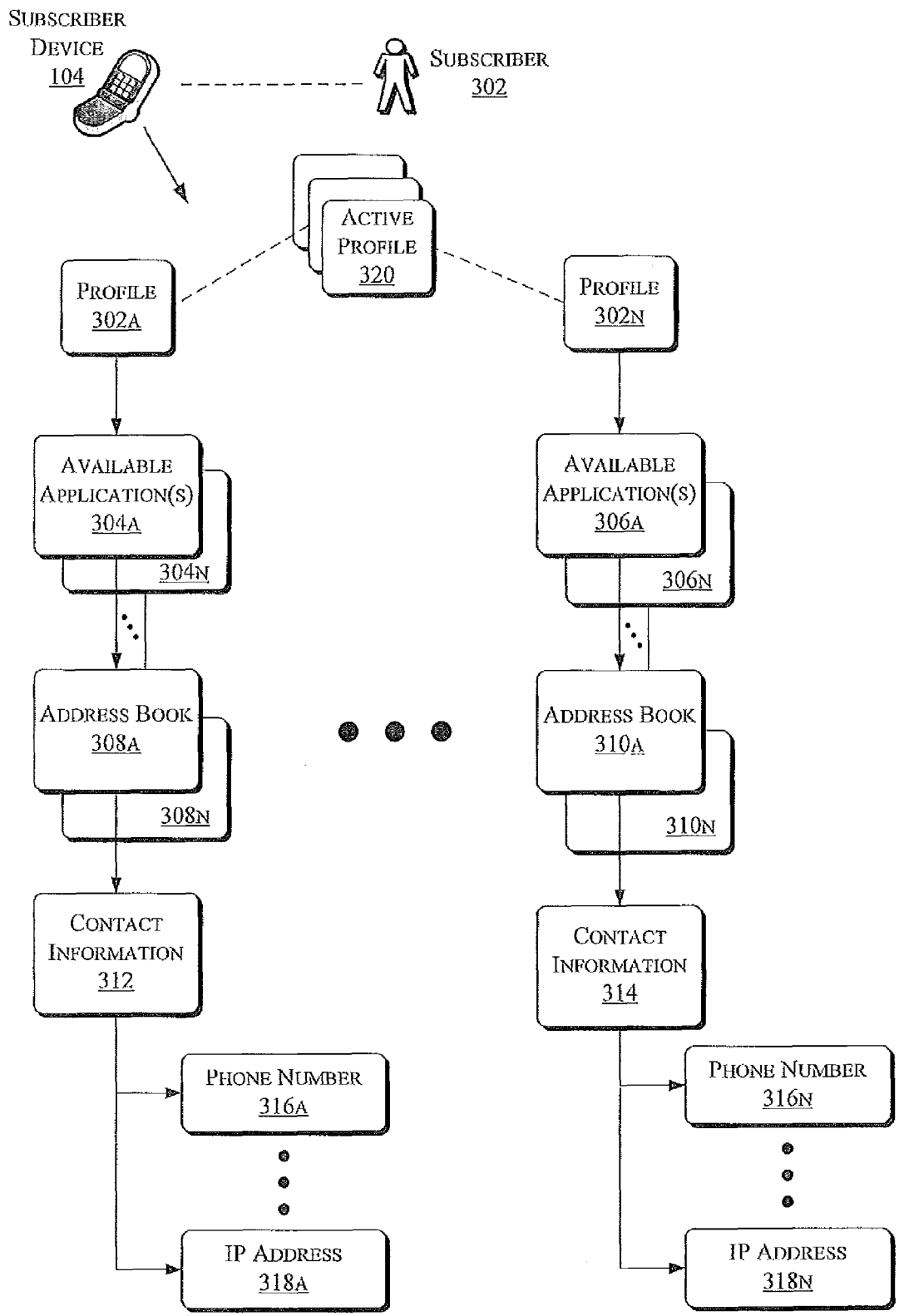
FIG. 3 is a block diagram of a plurality of different profiles that may be supported by the wireless communications devices.

Having described the components and data flows in FIG. 2, the discussion now turns to a description a plurality of different profiles that may be supported by the subscriber devices 104, now presented with FIG. 3.

FIG. 3 illustrates a plurality of different profiles 302 that may be supported by the subscriber devices 104. For example only, but not limitation, FIG. 3 shows an example subscriber device 104 associated with two profiles 302A and 302N, but single instances of the subscriber devices could support any number of different profiles. For example, a subscriber could configure his or her device with a profile for work-related use, and a profile for personal use. In other examples, the subscriber may define profiles pertaining to volunteer work, charitable activities, board-of-directors positions, or the like.

The various profiles 302 may be associated with one or more applications 304 and 306 that are available under the different profiles 302. For example, a subscriber may use an enterprise e-mail application provided by his or her employer for work purposes, but may use a more basic e-mail application for personal correspondence. In any event, FIG. 3 shows the profile 302A as associated with any number of applications 304A and 304N, and the profile 302N as associated with any number of applications 306A and 306N.

The applications 304 and 306 may be associated with respective address books or other forms of contact lists, denoted generally at 308 and 310. More specifically, FIG. 3 shows the application 304A associated with an address book 308A, and the application 304N associated with an address book 308N. FIG. 3 also shows the application 306A associated with an address book 310A, and the application 306N associated with an address book 310N.

The various address books 308 and/or 310 may include various instances of contact information 312 and/or 314. This contact information may generally take any form suitable for addressing voice or data communications to a person, or for receiving such communications from a person. For example, the contact information may include phone numbers (e.g., 316A and 316N, collectively 316), addresses (e.g., 318A and 318N, collectively 318), or the like. The addresses 318 may take the form of network addresses, IP addresses, e-mail addresses, street address, Global Positioning Satellite coordinates or any other convenient form.

At any given time, the subscriber 102 may make one or more of the profiles 302 active, as denoted by blocks 320. When different ones of the profiles are active, the applications and address books corresponding to the active profiles are available for execution. For example, if the subscriber 102 has defined a profile 302 for work-related purposes, the subscriber may have that work-related profile active whenever the subscriber is "on call" to respond to work-related matters.

Figure 4:
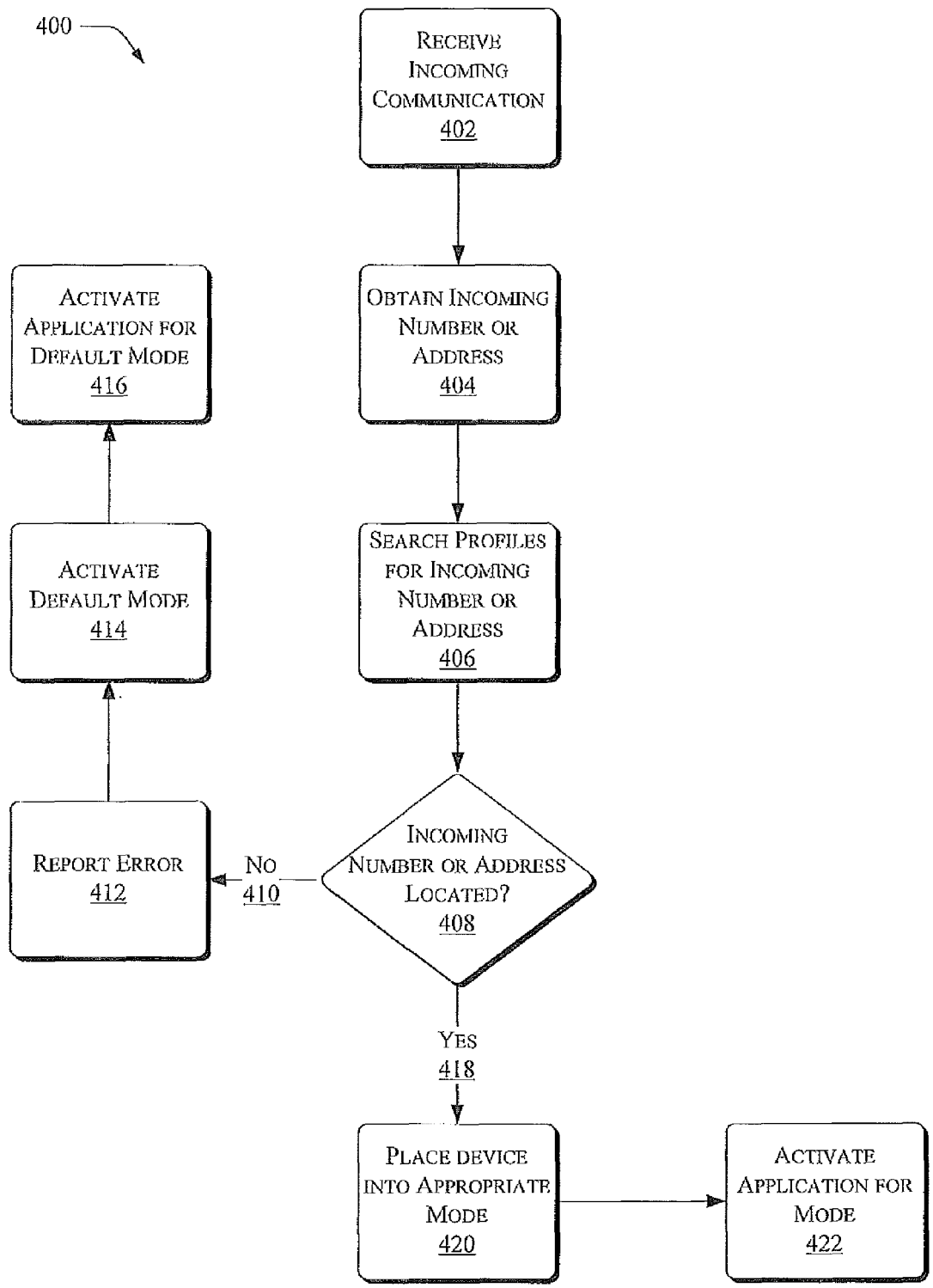
FIG. 4 is a flow diagram of a process performed when the wireless communications devices receive terminating or incoming communications.
Figure 5:
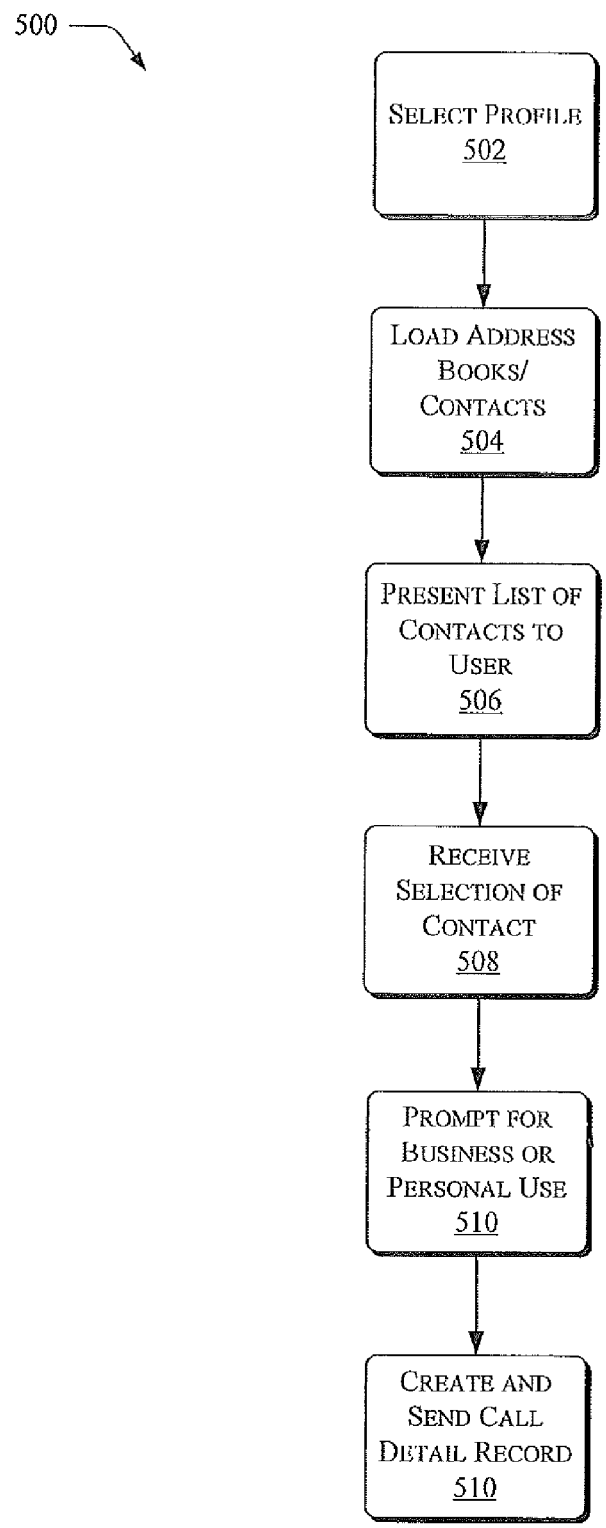
FIG. 5 is a flow diagram of a process performed when the wireless communications devices initiate outgoing communications.

Having described the profiles in connection with FIG. 3, the discussion now turns to a description of how these profiles may be used to handle incoming or outgoing communications, now presented with FIGS. 4 and 5.

FIG. 4 illustrates a process 400 that may be performed when the subscriber devices (e.g., 104) receive terminating or incoming communications. While the process 400 is described in connection with certain components illustrated herein, it is noted that some or all of the process 400 may be performed with other components without departing from the scope of the description herein.

Block 402 represents receiving the incoming communication at the subscriber devices. These communications may take the form of incoming voice calls arriving via one or more circuit-switched or packet-switched communications network, or may be data communications (e.g., audio or video streams, e-mails, or the like).

Block 404 represents obtaining a telephone number, network address (as might be used in VoIP communications), or other similar identifier, indicating where the incoming communication is directed. For example, if an incoming voice call is directed to (555) 555-1212, then block 404 may include obtaining this dialed number. Block 404 may thus include using the Dialed Number Information Service (DNIS), or other equivalents.

Block 406 represents searching one or more profiles associated with the device that receives the incoming communication. FIG. 3 shows examples of the profiles at 302. More specifically, block 406 may include searching contact information records (e.g., 312 and/or 314) for any contact that matches the incoming identifier obtained in block 404.

Decision block 408 may include evaluating whether the incoming identifier was located in any of the profiles. If not, the process 400 takes No branch 410 to block 412. In block 412, the process 400 may report this condition to the subscriber, and prompt the subscriber for instructions. In some instances, the process 400 may activate a default mode for the device, as represented generally in block 414. In block 416, the process 400 may start an application associated with this default mode. In these instances, the process 400 may omit the notification shown in block 412, but may instead perform block 414 and/or black 416 without providing the notification.

From block 408, if the incoming identifier was located in one of the profiles, then the process 400 takes Yes branch 418 to block 420. Block 420 represents placing the device into a mode corresponding to the profile in which the incoming identifier was located. For example, referring briefly to FIG. 3, assume that the incoming identifier of the phone number (555) 555-1212 was located under the profile 302A. In this scenario, block 420 may include placing the device into its business or professional mode.

Block 422 represents activating one or more applications in response to locating the incoming identifier in blocks 406 and 408. For example, assume that the profile 302A is associated with a business or professional mode, and, as such, is associated with one or more enterprise-type applications 304. Block 422 may include activating these applications so that the subscriber may readily use them to respond or process the incoming communication.

FIG. 5 illustrates a process 500 that may be performed when the wireless communications devices initiate outgoing communications. While the process 500 is described in connection with certain components illustrated herein, it is noted that some or all of the process 500 may be performed with other components without departing from the scope of the description herein.

Block 502 represents enabling the subscriber to configure the device into one of a plurality of different operating modes (e.g., business, personal, or the like) and select an application with which to initiate the outgoing communication, using a device such as the device 104. Block 502 may include enabling the user to select a profile in which the device is to operate. Examples of profiles are shown in FIG. 3 at 320.

Block 504 represents loading any address books, contact lists, or similar structures for presentation to the subscriber. Block 504 may include loading the entries in the address book into a menu structure for review and selection by the subscriber.

Block 506 represents presenting the list of contacts to the subscriber. The contacts may be associated with one or more instances of contact information (e.g., telephone numbers, network or IP addresses, e-mail addresses, chat or IM names, or the like). Block 506 may include presenting these instances of contact information.

Block 508 represents receiving a selection of one of the contacts, as a destination or target of the outgoing communication. In instances where a given contact is associated with more than one instance of contact information, block 508 may include enabling the subscriber to select the contact information to use for the outgoing communication.

Finally, block 512 represents creating and sending a call detail record relating to the outgoing communication.

Figure 6:
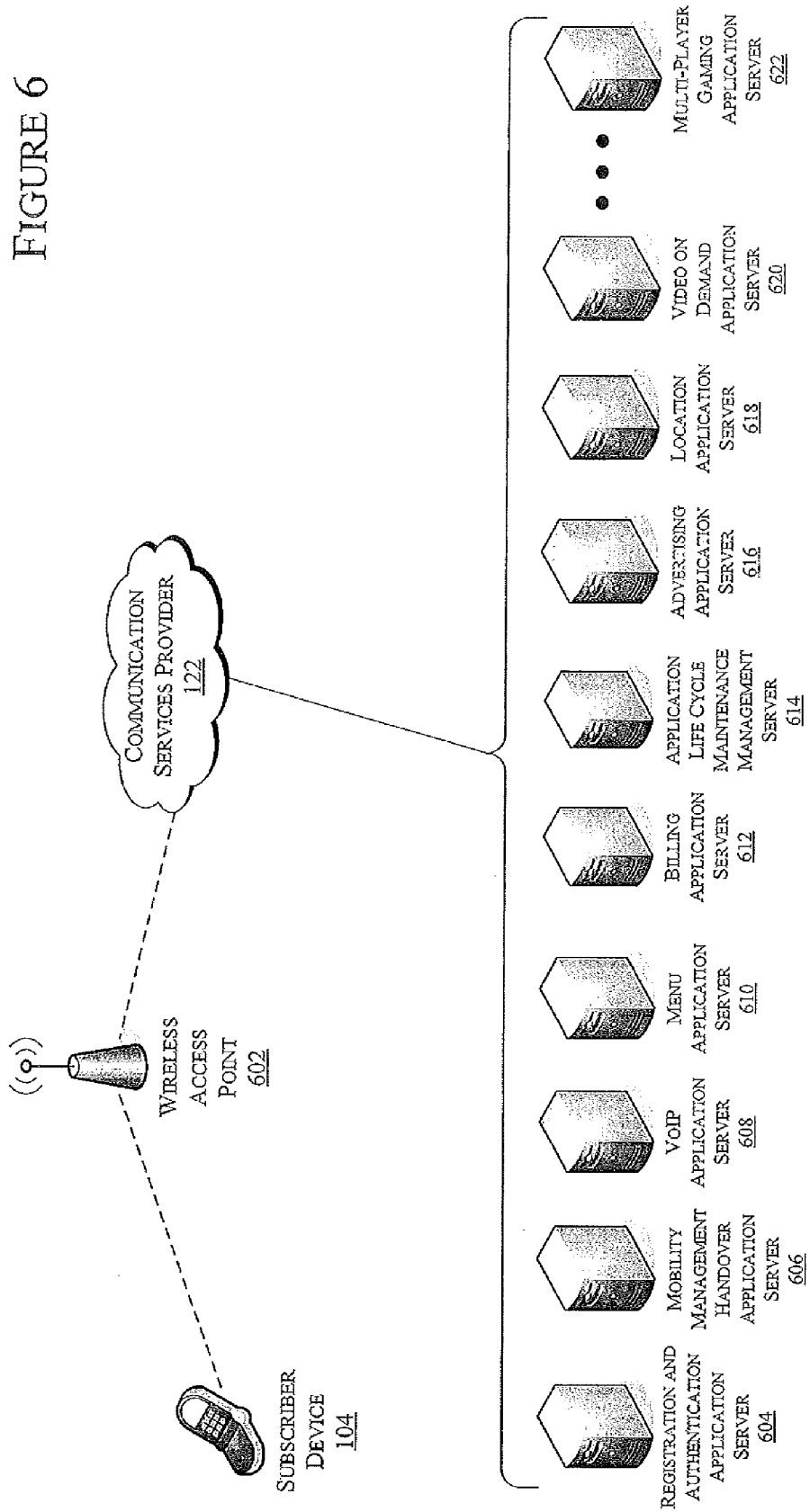
FIG. 6 is a block diagram of illustrative components of a communications service provider, suitable for supporting life cycle management of user-selected applications on wireless communications devices.

Having described the process flows with FIGS. 4 and 5, the discussion now turns to a description of illustrative servers that may be included in the communication services provider, now presented with FIG. 6.

FIG. 6 illustrates example components of the communications service provider 122, suitable for supporting life cycle management of user-selected applications on wireless communications devices. The device 104 may communicate with the provider 122 through a wireless access point 602, which generally functions to provide a gateway into a broadband communications network. For example, the access point 602 may be implemented as a wireless router that is compliant with WiFi (i.e., IEEE 802.11) or WIMAX (i.e., IEEE 802.16) specifications to operate within unlicensed communication frequencies. Additionally, other implementations of the access point 602 may operate within licensed communication spectrum with a variety of broadband wireless IP protocols: (e.g., WiMax, UMTS/HSDPA, CDMA EVDO, EDGE, and the like).

The communications service provider 122 may include one or more application servers, as shown in FIG. 6. The configuration shown in FIG. 6 is chosen for convenience only, but not to limit possible implementations of the communications service provider 122. More specifically, the various servers are shown only for ease of reference in describing different illustrative functions, and these functions could be combined or redistributed among different servers without departing from the scope and spirit of the description herein.

Turning to the servers in more detail, some of the servers may be related to core functions, such as those represented in FIG. 1 at block 112. For example, a registration and authentication application server 604 may handle core functions such as registering and authenticating the device 104 onto communication networks. A mobility management handover application server 606 may administer the handing over of the devices 104 from one cell to another as the devices move geographically. A VoIP application server 608 may store and distribute voice or data packets related to ongoing conversations, in implementations using the Voice of IP protocol. A menu application server 610 may control the display and choices of applications that are available to the subscriber to download. A billing application server 612 maintains billing and call detail records relating to the various subscribers 102. As the subscribers originate outgoing communications and/or receive in coming communications, the billing server 612 updates call detail records accordingly.

An application life cycle maintenance management server 614 administers subscriber-selected functions, such as those represented in FIG. 1 at block 114. Generally, the management server 614 enables the subscribers 102 to configure their devices 104 as most appropriate for their intended uses, enabling the subscribers to download and install particular applications. Further details relating to functions performed by the management server 614 are now provided with FIG. 7.

An advertising application server 616 may store the advertisements that are presented to the subscribers 102 via the devices 104. Examples of advertisements are shown in FIG. 2 at 204 and 206. FIG. 2 also shows example advertisement presentation modules at 202. The advertising application server 616 may, for example, push advertising content to the advertisement presentation modules on the devices 104.

A location application server 618 may store and track the locations of various subscriber devices 104. In this manner, the location application server may enable the communication services provider to monitor the locations of the devices 104 at any particular time.

A video on demand application server 620 may store video content that may be streamed on demand to the subscriber device 104. Thus, the video on demand application server may enable subscribers to access video content via the device 104.

A multiplayer gaming application 622 may store gaming content, and enable subscribers to access the gaming content via the devices 104. In some instances, the multiplayer gaming application may enable two or more of the subscribers to play games with one another, whether in adversarial or collaborative roles. In other instances, the multiplayer gaming application may enable single subscribers to access the gaming content on a more solitary basis.

Figure 7:
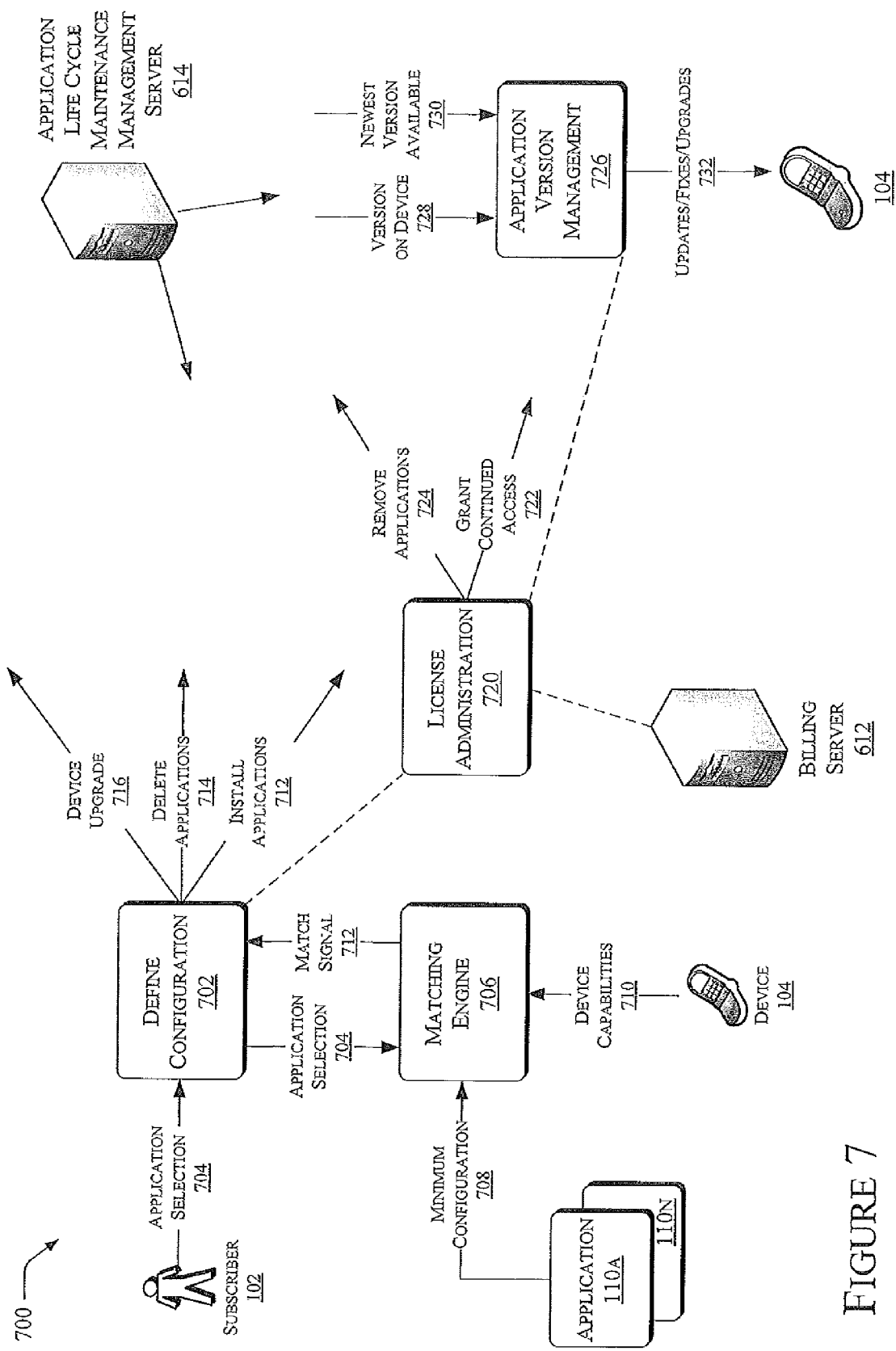
FIG. 7 is a block diagram of illustrative functions that may be performed by an application life cycle maintenance management server, as shown in FIG. 6.

FIG. 7 illustrates several examples of functions that may be performed by the application life cycle maintenance management server 614, as shown in FIG. 6. As represented generally in block 702, the management server 614 may manage how the devices 104 are configured, for example, when the subscribers first obtain the devices 104 or at any time afterwards. More specifically, the configuration management block 702 may receive data representing a selection 704 made by a subscriber (e.g., the subscriber 102) of one or more applications (e.g., the applications 110A and 110N) for installation on the device 104.

The configuration management block 702 may pass the selection 704 through to a matching engine 706, which determines whether the selected application may be installed on the device. The matching engine may receive data representing minimum configuration parameters 708 for different respective applications 110. The matching engine may also receive data representing capabilities 710 of particular devices, such as the amount of available storage. It is assumed that the device 104 as shown in FIG. 7 is associated with the subscriber 102, such that the subscriber has requested to install an application onto the device.

The matching engine 706 may compare the configuration parameters 708 for a given application to the capabilities 710 of a given device, to determine whether the application may be installed on the device. Examples of these device capabilities may include memory capacity, processor speed, display capabilities, and the like. If the capabilities 710 of the given device match or exceed the configuration parameters 708 for the given application, then the application may be installed on the device. A match signal 712 may indicate whether the application may be installed on the device, and may pass from the matching engine to the configuration management block 702.

If the match signal 712 indicates that the application may be installed on the device, the configuration management block 702 may so install the application, as represented at 714. However, if the match signal 712 indicates that the application is not a match for the device as currently configured, the configuration block 702 may recommend that the subscriber delete one or more applications currently installed on the device, as represented at 716. Additionally, the configuration block 702 may recommend that the subscriber upgrade to, a different device, as represented at 718. In this latter scenario, the configuration block 702 may provision the upgraded device with the applications 110 previously selected by the subscriber.

Once the device is installed and configured with the selected applications, the management server 614 may administer any licensing issues related to these applications on an ongoing basis. Block 720 represents this license administration function. Typically, the subscriber, when installing applications onto the device, does not obtain ownership rights in the applications, but instead obtains a license to use the application. These license rights may be subject to the subscriber paying license fees and/or performing other obligations. These payments and other obligations may be tracked by the billing server 612, shown in FIG. 6 and carried forward to FIG. 7 for convenience.

If the subscriber remains current on any license payments related to a given application, and performs any other obligations, then the license administration block 720 grants the subscriber continued access to the given application, as represented at 722. However, if the subscriber is not current on the license payments related to a given application, or fails to perform any other obligations, then the license administration block 720 may send a notification to the subscriber, detailing what the subscriber may do to become current and maintain access to the applications. If the subscriber does not become current, the license administration block 720 may remove or disable the given application on the subscriber's device, as represented at 724.

The management server 614 may also manage the client applications installed on the devices, as subsequent versions of those applications become available. For example, vendors providing those applications (e.g., the application providers 120 in FIG. 1) may introduce new features, fix bugs present in earlier versions, or the like. In any event, an application version management block 726 may receive data 728 representing versions of one or more applications currently installed on the device. The version management block 726 may also receive data 730 representing the newest versions of those applications. If the newest versions of the applications are not installed on the device, then the version management block 726 may push updated versions of the applications to the device. These updated versions are represented in FIG. 7 at 732. The updated versions 732 may be pushed to the devices 104 when the devices 104 are in communication with the services provider 122 and the management server 614.

Having provided the above description, several observations are now noted. The tools and techniques described above for performing life cycle management of user-selected applications on wireless communications devices enable use of a client-services model for maintaining the applications on the devices, with the services provider 122 (and related components) assuming a server role, and the various devices 104 assuming a client role. Additionally, the services provider 122 and the management server 614 may provide a network-based, automated platform for configuring and managing application installed on a variety of subscriber devices, thereby relieving the subscribers from these tasks.

It is noted that the various modules and servers shown in the Figures herein may be implemented in hardware, software, or any combination thereof. Additionally, these modules and servers are shown as separate items only for convenience of reference and description, and these representations do not limit possible implementations of the teachings herein. Instead, various functions described with these modules and servers could be combined or separated as appropriate in a given implementation, without departing from the scope and spirit of the description herein.

CONCLUSION

Although tools and techniques for performing life cycle management of user-selected applications on wireless communications devices have been described in language specific to certain features and methods, it is to be understood that the features defined in the appended claims are not necessarily limited to the specific features and methods described. Rather, the specific features and methods are disclosed as illustrative forms of implementing the claimed subject matter.

What is claimed is:

1. A method, comprising:
receiving, by a system comprising a processor, from a user interface of a mobile communications device, a first user input for configuring a first user profile to be maintained at the mobile communications device;
receiving, by the system, from the user interface of the mobile communications device, a second user input for configuring a second user profile, distinct from the first profile, to be maintained at the mobile communications device;
receiving, by the system, from the user interface of the mobile communications device, a third user input indicating the first user profile and a first executable application to initiate an installation of the first executable application in association with the first user profile at the mobile communications device;
receiving, by the system, from the user interface of the mobile communications device, a fourth user input indicating the second user profile and a second executable application to initiate an installation of the second executable application in association with the first user profile at the mobile communications device;
initiating, by the system, in response to the third user input, a storage of the first executable application at a memory of the mobile communications device such that the first executable application is associated in the memory with the first user profile maintained at the mobile communications device; and
initiating, by the system, in response to the fourth user input, a storage of the second executable application at the memory of the mobile communications device such that the second executable application is associated in the memory with the second user profile maintained at the mobile communications device.

2. The method of claim 1, further comprising:
receiving a communication; and
determining that the communication is not associated with any pre-set user profile, including the first user profile and the second user profile, at the mobile communications device.

3. The method of claim 2, wherein:
the first user profile is associated with a first mode of operation for the mobile communications device;
the second user profile is associated with a second mode of operation for the mobile communications device; and
the method further comprises initiating a switching of the mobile communications device to a default mode, for processing the communication, in response to determining that the communication is not associated with any pre-set user profile at the mobile communications device, wherein the default mode differs from the first mode associated with the first user profile and the second mode associated with the second user profile.

4. The method of claim 2, further comprising initiating a presentation, by the mobile communications device, of a user notification in response to determining that the communication is not associated with any pre-set user profile, wherein the user notification indicates that the received communication is not associated with any pre-set user profile at the mobile communications device.

5. The method of claim 4, wherein the notification includes a prompt requesting user instructions.

6. The method of claim 1, further comprising initiating at least one presentation, by the mobile communications device, of a plurality of executable applications as options for installation at the mobile communications device, wherein:
the first user input is received in response to the presentation of the plurality of executable applications; and
the second user input is received in response to the presentation of the plurality of executable applications.

7. The method of claim 1, further comprising:
receiving a communication; and
determining that the communication is associated with the first user profile at the mobile communications device.

8. The method of claim 7, further comprising initiating, in response to determining that the communication is associated with the first user profile, a switching of the mobile communications device to a first mode associated with the first user profile at the mobile communications device.

9. The method of claim 7, further comprising activating, in response to determining that the communication is associated with the first user profile, the first executable application, associated with the first user profile at the mobile communications device, for processing the communication received.

10. The method of claim 7, wherein:
the communication is a first communication; and
the method further comprises:
receiving a second communication; and
determining that the second communication is associated with the second user profile at the mobile communications device.

11. The method of claim 10, further comprising initiating, in response to determining that the second communication is associated with the second user profile, a switching of the mobile communications device to a second mode associated with the second user profile at the mobile communications device.

12. The method of claim 10, further comprising activating, in response to determining that the second communication is associated with the second user profile, the second executable application, associated with the second user profile at the mobile communications device, for processing the second communication received.

13. The method of claim 1, wherein:
the first user profile is associated with business use of the mobile communications device; and
the second user profile is associated with personal use of the mobile communications device.

14. The method of claim 1, wherein:
the first user profile is associated with a first identifier and a first mode for the mobile communications device;
the second user profile is associated with a second identifier, being distinct from the first identifier, and a second mode for the mobile communications device; and
the method further comprises:
obtaining a communication identifier from the communication;
determining whether the communication identifier matches an identifier of the first user profile and the second user profile; and
placing the device in the first mode in response to determining the communication identifier matches the first identifier.

15. The method of claim 14, further comprising activating, in response to placing the device in the first mode, the first executable application, for processing the communication received.

16. A system, comprising:
a processor; and
a computer-readable storage device comprising a non-transitory computer-executable instructions that, when executed by the processor, cause the processor to perform operations comprising:
receiving, from a user interface of a mobile communications device, a first user input for configuring a first user profile to be maintained at the mobile communications device;
receiving, from the user interface of the mobile communications device, a second user input for configuring a second user profile, distinct from the first profile, to be maintained at the mobile communications device;
receiving, from the user interface of the mobile communications device, a third user input indicating the first user profile and a first executable application to initiate an installation of the first executable application in association with the first user profile at the mobile communications device;
receiving, from the user interface of the mobile communications device, a fourth user input indicating the second user profile and a second executable application to initiate an installation of the second executable application in association with the first user profile at the mobile communications device;
initiating, in response to the third user input, a storage of the first executable application at a memory of the mobile communications device such that the first executable application is associated in the memory with the first user profile maintained at the mobile communications device; and
initiating, in response to the fourth user input, a storage of the second executable application at the memory of the mobile communications device such that the second executable application is associated in the memory with the second user profile maintained at the mobile communications device.

17. The system of claim 16, wherein:
the first user profile is associated with a first identifier and a first mode for the mobile communications device;
the second user profile is associated with a second identifier, being distinct from the first identifier, and a second mode for the mobile communications device; and
the operations further comprise:
obtaining a communication identifier from the communication;
determining whether the communication identifier matches an identifier of the first user profile and the second user profile; and
placing the device in the first mode in response to determining the communication identifier matches the first identifier.

18. The system of claim 17, wherein the operations further comprise activating, in response to placing the device in the first mode, the first executable application, for processing the communication received.

19. The system of claim 16, wherein:
the first user profile is associated with business use of the mobile communications device; and
the second user profile is associated with personal use of the mobile communications device.

20. A computer-readable storage device comprising a non-transitory computer-executable instructions that, when executed by a processor, cause the processor to perform operations comprising:
receiving, from a user interface of a mobile communications device, a first user input for configuring a first user profile to be maintained at the mobile communications device;
receiving, from the user interface of the mobile communications device, a second user input for configuring a second user profile, distinct from the first profile, to be maintained at the mobile communications device;
receiving, from the user interface of the mobile communications device, a third user input indicating the first user profile and a first executable application to initiate an installation of the first executable application in association with the first user profile at the mobile communications device;
receiving, from the user interface of the mobile communications device, a fourth user input indicating the second user profile and a second executable application to initiate an installation of the second executable application in association with the first user profile at the mobile communications device;
initiating, in response to the third user input, a storage of the first executable application at a memory of the mobile communications device such that the first executable application is associated in the memory with the first user profile maintained at the mobile communications device; and
initiating, in response to the fourth user input, a storage of the second executable application at the memory of the mobile communications device such that the second executable application is associated in the memory with the second user profile maintained at the mobile communications device.

* * * * *